UNITED STATES PATENT OFFICE.

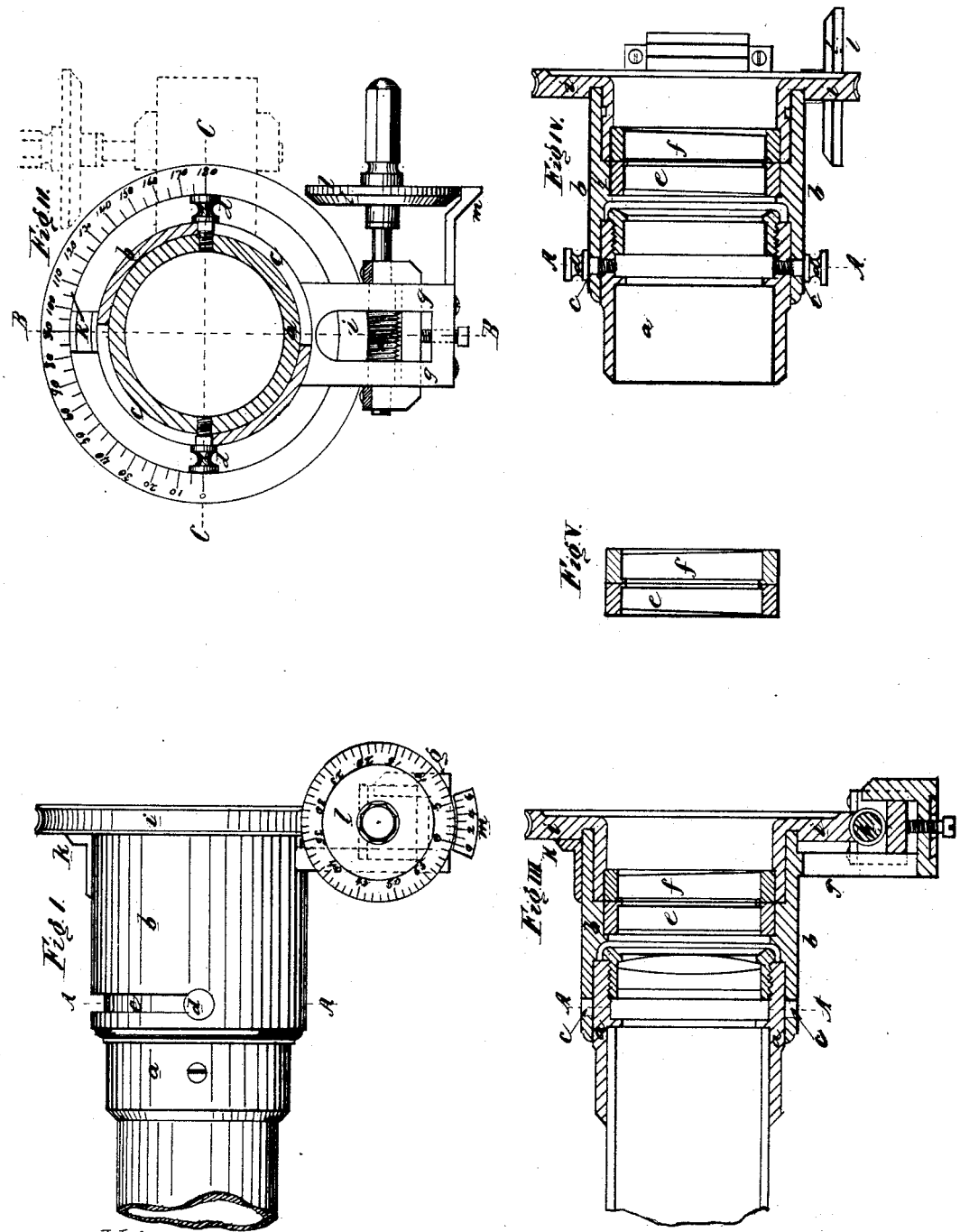

ADOLPH MOSER, OF AIX LA CHAPELLE, PRUSSIA.

IMPROVEMENT IN TELESCOPES.

Specification forming part of Letters Patent No. 189,850, dated April 24, 1877; application filed October 10, 1876.

*To all whom it may concern:*

Be it known that I, ADOLPH MOSER, of Aix la Chapelle, in the Kingdom of Prussia, engineer, have invented an Improvement in the Construction of Telescopes used in instruments for measuring angles; and do hereby declare the nature of my invention, and the manner in which the same is to be performed, to be particularly described and ascertained in and by the following statement thereof, reference being had to the accompanying drawing, and to the figures and letters marked thereon—that is to say:

This invention relates to the construction of dioptric telescopes used in instruments for precise angular measurements, such as theodolites, telemeters, and other instruments for similar purposes.

The improvement consists in the application and special arrangement, hereafter described, of two circular prisms of glass, or other suitable transparent substance of homogeneous structure, for the purpose of measuring the more minute angles by means of refraction. This I attain by making both prisms to refract the rays of light at precisely the same particular angle; but which angle may vary according to the object of the instrument and the accuracy of measurement required. For geodetical instruments I should mostly adopt an angle of thirty minutes; but whatever angle may be adopted it must be, as far as possible, perfectly exact, this being, however, attended with considerable difficulty. If the prism is made of a single plate, I compose each prism of two circular plates with even surfaces, of which the angle of refraction is somewhat more than half the one required. By uniting them with Canada balsam the prism can then be adjusted to the required angle with the greatest precision by gradually turning the plates in opposite directions. The said two prisms being thus prepared they are applied to the telescope as follows:

Figure 1 is a side view of part of a telescope, with the said improvement. Fig. 2 is a cross-section through A A. Fig. 3 is a longitudinal section through B B. Fig. 4 is a horizontal section through C C, showing the prisms in a relative position, by which the rays of light experience no deviation from the direction of the optical axis; and Fig. 5 shows the prisms in a position by which the refraction is exactly one degree, when that of each prism is thirty minutes.

Th short tube *a*, containing the object-lens, being part of the telescope-tube, to which it is fastened by screws, requires no explanation. The piece *b* is fitted over this, and having upon its circumference two slits, *c c*, it can be turned round ninety degrees, and fixed by means of the set-screws *d d*. It contains the two prisms *e* and *f*, and has the mechanism for turning the prism *f* attached to it. The prism *e*, which always remains stationary during the act of measuring, is so fixed in its place that the angle of refraction is horizontal when the arm *g* is vertical. This arm carries a double bearing for the endless screw or worm, *h*, which works in the teeth of the worm-wheel *i*. A short cylindrical projection in the center of this wheel fits inside the piece *b* and holds the prism *f*. The angle of refraction of this prism will therefore be varied in a horizontal and vertical sense by the movement of the said worm-wheel, the circumference of which being provided with three hundred and sixty teeth, each turn of the screw will move it, and also the prism *f*, exactly one degree. The number of degrees moved are indicated by the division on its inner surface and the index *k*. They extend to half a circle, and are therefore one hundred and eighty in number. One end of the worm *h* carries a small disk, *l*, the circumference of which being divided into sixty equal parts, as in Fig. 2, they will indicate the angular minutes described. Smaller angles down to ten seconds are indicated by the vernier upon the index *m*, which division is sufficiently small for geodetical measurements, as a difference of ten seconds in the angular movement of the worm-wheel will not cause a variation of one-tenth of a second in the angle of refraction, and it is scarcely necessary to remind that while the former is one hundred and eighty degrees the latter is only one degree.

The prism *f* must be fixed in such a position that its refracting angle be exactly opposite to that of the prism *e*, as in Fig. 4, when the index stands upon zero, because the rays of light reflected from the object aimed at will then be refracted under the same angle; but in opposite direction therefore there will be mutual compensation, and no deviation at all. But when the worm-wheel has been turned round one hundred and eighty degrees the prism $f$ will be in the position shown in Fig. 5, and the rays of light will then deviate from the optical axis in the flame of the refracting angle precisely one degree.

Between these limits, from zero to one degree, we can imagine any number of equal parts, and supposing it to be thirty-six thousand, each part will represent exactly one-tenth of a second, any number of which can be determined with the greatest accuracy by calculation, and the only limit to the observation of so minute an angle will depend upon the size and perfection of the telescope, the light reflected from the object aimed at, and the distinguishing power of the human eye.

To measure the angle between two distant objects, I first bring the prism $f$ upon zero and direct the hair cross of the telescope upon one of these objects. Keeping it fixed in this position I turn the prism, by means of the mechanism before described, until the hair cross covers the other object. From the angle thus described I find the corresponding versed sine, which represents the angle sought for in seconds or parts of a second, either by calculation or by referring to the table.

When the angle to be measured is vertical the piece $b$, with all that is attached to it, must be turned round ninety degrees. It will then be in the position shown in Fig. 2 by dotted lines, in which position it must be fixed during the act of measuring.

The prisms may also be placed between the ocular and the object lens. They can then be less in diameter in proportion to the section of the cone of light within the telescope.

I have already stated that when the refracting angles of the prisms are either exactly opposite to each other, as in Fig. 4, or both in the same direction, as in Fig. 5, there will, in the first case, be no deviation of the rays of light, and just the same as if there were no prisms in the telescope. In the second case, the deviation will be exactly one degree; but when the prism $f$ is brought into any other position the object will not only appear to move in one direction, but also at right angles to it, and it is therefore necessary to move the telescope vertically when the angle to be measured by the prisms is horizontal, and horizontally when the same is vertical. This does not, however, in the least affect the accuracy of the measurement, provided the mechanisms for both movements are sufficiently correct, as is the case in all good instruments of that kind.

Having thus fully described my invention, what I claim, and desire to secure by Letters Patent, is—

1. The combination of two prisms revolving in the manner described, so that their power may be increased from zero to the sum of the powers of the two prisms, substantially as set forth.

2. A dioptric instrument, provided with two prisms revolving in the manner described, in combination with a micrometer, substantially as set forth.

In witness whereof I, the said ADOLPH MOSER, have hereunto set my hand and seal this 17th day of August, 1876.

ADOLPH MOSER. [L. S.]

Witnesses:
 LAURENZ BORRENKOVEN,
 HEINRICH BRUCKNER.